United States Patent
Brummette et al.

(10) Patent No.: US 7,633,852 B2
(45) Date of Patent: Dec. 15, 2009

(54) WIRELESS CONTROL SYSTEM FOR GROUND-MOBILE ROBOTIC VEHICLES

(75) Inventors: Steven C. Brummette, Knoxville, TN (US); Christopher True, Knoxville, TN (US)

(73) Assignee: Northrop Gruman Corporation, Los Angeles, CA (US)

( * ) Notice: Subject to any disclaimer, the term of this patent is extended or adjusted under 35 U.S.C. 154(b) by 604 days.

(21) Appl. No.: 11/425,633

(22) Filed: Jun. 21, 2006

(65) Prior Publication Data

US 2007/0297320 A1    Dec. 27, 2007

(51) Int. Cl.
*H04J 11/00*    (2006.01)

(52) U.S. Cl. .................. 370/208; 370/259; 370/329; 370/464; 700/245

(58) Field of Classification Search .................. 370/259
See application file for complete search history.

(56) References Cited

U.S. PATENT DOCUMENTS

| | | | |
|---|---|---|---|
| 7,164,368 B1 * | 1/2007 | Ireland | 341/34 |
| 2006/0058928 A1 * | 3/2006 | Beard et al. | 701/11 |
| 2006/0074525 A1 * | 4/2006 | Close et al. | 700/245 |
| 2006/0238877 A1 * | 10/2006 | Ashkenazi et al. | 359/630 |

* cited by examiner

*Primary Examiner*—Chi H. Pham
*Assistant Examiner*—Shick Hom
(74) *Attorney, Agent, or Firm*—Alston & Bird, LLP (57) ABSTRACT

A wireless control system for ground-mobile robotic systems in which communication between the operator control unit and the unmanned ground vehicle is transmitted via a plurality of spectrally efficient simplex communication links.

27 Claims, 5 Drawing Sheets

WIRELESS CONTROL SYSTEM FOR GROUND-MOBILE ROBOTIC VEHICLES

FIELD OF THE INVENTION

Exemplary embodiments of the invention generally relate to ground-based mobile robotic vehicles and, more particularly, relate to wireless control systems for ground-based mobile robotic vehicles.

BACKGROUND OF THE INVENTION

Ground-based mobile robotic vehicles (also termed ground-mobile robotic vehicles) are used to perform tasks hazardous to human safety. For example, ground-mobile robotic vehicles are often used by police and military personnel to move and/or detonate explosive devices. Ground-mobile robotic vehicles are used to obtain surveillance video and audio in hazardous locations, such as a building in which a suspected criminal may be located. Ground-mobile robotic vehicles are also used to reconnoiter potentially contaminated areas using chemical, nuclear, and/or biological sensors. Additionally, military ground-mobile robotic vehicles are used for security and the application of lethal force in combat areas.

Such ground-mobile robotic vehicles typically comprise an operator control unit (OCU) and an unmanned ground vehicle (UGV). The UGV typically comprises a chassis with a drive system including motor-driven wheels and/or an articulating track, a manipulator arm with gripper, surveillance camera and microphone for capturing video and audio for transmission to the OCU, a loudspeaker for broadcast of sound transmitted from the OCU, a plurality of sensors, mission-specific tools and implements, a communication interface (either hardwired or wireless, as discussed below), and one or more antennas (if the communication interface is wireless) for transmitting signals to and receiving signals from the OCU. The OCU typically comprises one or more control input devices, such as a joystick and keyboard, a display screen and other status indicators, a loudspeaker for broadcast of sound transmitted from the UGV, a microphone for capturing audio for transmission to and broadcast at the UGV, a communication interface (either hardwired or wireless, as discussed below), and one or more antennas (if the communication interface is wireless) for transmitting signals to and receiving signals from the UGV.

Either a hardwired ("tethered") or wireless ("non-tethered") communication link may be provided between the OCU and the UGV. Command and control data, as well as public address (PA) audio to be broadcast over the UGV loudspeaker, are typically transmitted from the OCU to the UGV via the communication link. Video and audio captured by the UGV, as well as sensor and status data, are typically transmitted from the UGV to the OCU via the communication link. A hardwired communication link typically comprises a fiber optic cable in a hardened casing. Such a hardwired communication link provides a large amount of bandwidth for transmitting large amounts of data quickly between the OCU and UGV. However, a hardwired communication link limits the distance that the UGV may travel from the OCU. Additionally, it is possible that the cable may snag on an obstruction thus preventing movement of the OCU. A wireless communication link typically comprises one or more radio frequency (RF) transmitters and receivers at both the OCU and the UGV. A wireless communication link between the OCU and the UGV will typically enable the UGV to travel further from the OCU and eliminates any risk of snagging. However, existing wireless communication links also present problems, as will be discussed in detail below.

Ground-based mobile robotic vehicles deployed using a wireless communication link typically involve transmitting and receiving a suitable set of base band signals over the RF communications link to allow for tele-operation (i.e., remote control) or monitoring of autonomous behavior by remote equipment or human beings. Typically, the base band signals transmitted and received over the RF communications link for real-time tele-operations comprise command and control data from the OCU to the UGV and low-latency camera video from the UGV to the OCU. The data signal must have a sufficiently low bit error rate and latency to provide safe and robust mobile command and control. The video signal must be of sufficient quality and, at the same time, have a sufficiently low latency to provide safe and robust mobile command and control. In addition to data and video, audio signals are often utilized to provide enhanced operator awareness of the UGV environment and status of the UGV itself. Audio generated from a surveillance microphone located on the UGV provides an audio signal synchronized with the live camera video and is transported in the same RF channel to drive a loudspeaker located at the OCU. A public address audio channel is used to provide audio generated from an operator microphone at the OCU to drive a loudspeaker located at the UGV, providing bi-directional voice communications between an operator and personnel in the UGV operating environment (e.g., remote hostage negotiation and imminent explosive detonation safety warning announcements).

The RF carrier modulation schemes typically employed to transmit and receive the video, audio, and data base band signals are amplitude modulation (AM), frequency modulation (FM), spread spectrum modulations such as direct sequence spread spectrum (DSSS) and frequency hopping spread spectrum (FHSS), and wireless local area networks (WLAN). Each of these RF carrier modulation schemes has regulatory restrictions and performance deficiencies problematic for use in ground-mobile robotic vehicles.

In the United States, federal law prohibits the transmission of composite video by AM from a mobile platform. As such, FM systems are commonly used for video, audio, and data. However, FM receivers, particularly wide-band receivers required for live composite video, have serious deficiencies in overcoming distortion products produced by multi-path fade signals encountered when systems are operated inside and around man-made structures and naturally occurring solid objects, such as vegetation and significant terrain contour. Further exacerbating the problem with wide band FM in mobility systems are restrictions on radiated power coupled with the poor receiver sensitivity inherent in a 17.5 MHz (or wider) front-end pass-band, which is typically required for an FM system during operations to transmit the necessary base band information. The maximum transmission power limits couple with poor sensitivity to produce a limited system dynamic range. Typically, this system dynamic power range is +37 dBm (the maximum Federal Communications Commission (FCC) transmission power limit for mobile FM video) to −83 dBm (the smallest signal detectable by an FM video receiver).

Spread spectrum techniques, which also may be wide-band when used to transport video (typically 22 MHz channel bandwidth or more), have range performance issues when used at power levels allowed by federal law for non-federal law enforcement and other public safety organizations for this application (i.e., +30 dBm or less) and are spectrally inefficient. WLAN has poor range at legal power limits, and is prone to interference from other devices, due to federal regulatory restrictions which cluster these devices in small, shared bands of RF spectrum.

The high bandwidth requirement of these modulation methods used in RF video links do not allow for a high level of wireless robotic system performance due to decreased receiver sensitivity. These modulation methods are typically susceptible to fading and distortion caused by high multi-path RF environments. These high multi-path RF environments are commonplace in a tele-operated ground mobile robotics application. Multi-path fading and distortion is produced when the signal of interest and ghost images of this signal, the ghost images having bounced off of obstacles in their path to the receiver, are all detected by the receiver front end at the same time but arrive at different phase angles. In systems with no means to correct arrival time errors (time domain), such as FM, AM, and most WLAN architectures, the ghost images are detected as noise products and degrade the critical signal to noise ratio at the receiver. Unmanned mobility platforms typically experience Rayleigh and Ricean (probability distribution) signal fading limiting the mobility stand-off range from the OCU, which again is worsened by a high bandwidth requirement. Additionally, FM does not allow for forward error correction, which is desirable in these applications to correct errors caused by fading and distortion.

BRIEF SUMMARY OF THE INVENTION

Generally described, exemplary embodiments of the invention provide an improvement over the known prior art by providing a wireless control system for ground-mobile robotic systems in which communication between the operator control unit and the unmanned ground vehicle is transmitted via a plurality of narrow-band simplex communication links.

In one exemplary embodiment, a ground-mobile robotic system comprises an operator control unit (OCU) and an unmanned ground vehicle (UGV). The OCU comprises a coded orthogonal frequency division multiplexing (COFDM) receiver, a first OCU transmitter, a second OCU transmitter configured to receive analog audio data from an OCU audio source, modulate the RF carrier with the audio data, and transmit the modulated audio data RF carrier via a simplex RF channel, and an OCU processing element configured to provide control data to the first OCU transmitter via a serial communication link. The UGV comprises a COFDM transmitter configured to receive analog video data from a video source and to receive analog audio data from a UGV audio source, a first UGV receiver, a second UGV receiver, and a UGV processing element configured to provide feedback data to the COFDM transmitter via a serial communication link.

The first OCU transmitter is configured to modulate the RF carrier with the control data and transmit the modulated control data RF carrier to the UGV via a simplex radio frequency (RF) channel such that the transmitted data is received by the first UGV receiver. The COFDM transmitter of the UGV is configured to multiplex the feedback data, the video data and the audio data, modulate the multiplexed data RF carriers using a COFDM scheme and transmit the modulated multiplexed data RF carriers to the OCU via a simplex RF channel. The COFDM receiver of the OCU is configured to receive the modulated multiplexed data RF carriers from the UGV, demodulate the received data RF carriers to extract the multiplexed data, and de-multiplex the extracted data into separate video data, audio data, and feedback data. The COFDM receiver is further configured to provide the video data to a video display element, provide the audio data to an OCU loudspeaker, and provide the feedback data to the OCU processing element.

The OCU processing element may be configured to provide control data to the first OCU transmitter via the serial communication link at a data speed less than 21 kilobits per second. The UGV processing element may be configured to provide feedback data to the COFDM transmitter via the serial communication link at a data speed less than 21 kilobits per second. The COFDM transmitter may be further configured to transmit the modulated multiplexed data RF carriers to the OCU via the simplex RF channel having a channel bandwidth less than 2.75 megahertz.

In one embodiment, the first and second OCU transmitters each comprise a frequency modulation (FM) transmitter and the first and second UGV receivers each comprise a frequency modulation (FM) receiver. The first OCU transmitter may be configured to modulate the control data RF carrier using an FM scheme and transmit the FM control data RF carrier to the UGV via a simplex RF channel. The second OCU transmitter may be configured to modulate the audio data RF carrier using an FM scheme and transmit the FM audio data RF carrier to the UGV via a simplex RF channel. The first UGV receiver may be configured to receive the modulated control data RF carrier, demodulate the received control data RF carrier to extract the control data, and provide the extracted control data to the UGV processing element. The second UGV receiver may be configured to receive the modulated audio data RF carrier, demodulate the received audio data RF carrier to extract the audio data, and provide the extracted audio data to a UGV loudspeaker. The first OCU transmitter may be configured to transmit the FM control data RF carrier to the UGV via a simplex RF channel having a channel bandwidth substantially equal to 25 kilohertz, and the second OCU transmitter may be configured to transmit the FM audio data RF carrier to the UGV via a simplex RF channel having a channel bandwidth less than 14 kilohertz.

In an alternative embodiment, the first and second OCU transmitters comprise a single COFDM transmitter configured to multiplex the control data and audio data, modulate the multiplexed data RF carriers using a COFDM scheme, and transmit the COFDM modulated multiplexed data RF carriers to the UGV via a simplex RF channel. The first and second UGV receivers comprise a single COFDM receiver configured to receive the modulated multiplexed data RF carriers, demodulate the received data RF carriers to extract the multiplexed data, de-multiplex the extracted data into control data and audio data, provide the control data to the UGV processing element, and provide the audio data to a UGV loudspeaker. The single COFDM transmitter may be configured to transmit the COFDM multiplexed data to the UGV via a simplex RF channel having a channel bandwidth less than 55 kilohertz.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Exemplary embodiments of the invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The ground-mobile robotic vehicle of embodiments of the invention utilizes an RF modulation scheme not typically used for robotics applications, i.e., coded orthogonal frequency division multiplexing (COFDM). COFDM has many advantages over other types of RF carrier modulation, such as AM, FM, DSSS, FHSS, and WLAN based communications systems, for use in non-line-of-sight (NLOS) mobile applications. In particular, the multi-path video signal fading and distortion problem is very effectively dealt with using COFDM. A COFDM RF video link is superior to AM, FM, DSSS, FHSS, and WLAN based communications systems for use in ground mobile robotics in a number of ways. For example, other modulation methods used in RF video links (e.g., wideband FM or wideband spread spectrum) do not allow for the high spectral efficiency which is made possible with a COFDM RF video link and which is required to transmit and receive video at near real time in this type of application. A COFDM RF channel optimized to transport low-latency composite video typically requires only a 2.5 MHz RF channel bandwidth versus the typical 17.5 MHz required for an FM system, thereby providing a seven-to-one improvement in the amount of RF spectrum occupied during operations to transport the same base band information. Furthermore, a COFDM RF video link, having a reduced receiver front end channel bandwidth (2.5 MHz) compared to the other RF video link examples, allows for an intrinsically higher level of receiver sensitivity (−100 dBm), directly improving RF dynamic range by allowing the receiver to sense weaker signals, thus improving system linear range capabilities for equal receiver antennas and RF field strengths without violating regulatory transmission power limits (+37 dBm) for wide band RF channels.

A COFDM RF video link is superior in overcoming fading and distortion caused by high multi-path RF environments. A COFDM RF video link does not have to discriminate between the signal of interest and ghost images at the receiver front end, since the signal processing algorithm following the receiver front end performs the discrimination and out of phase ghost signals are integrated back into the proper base band time sequence. Additionally, the overall Rayleigh fading distribution is improved for a COFDM RF video link due to the reduced channel bandwidth and, when a fade zone is encountered, several modulation components embedded within the scheme function to correct these errors in a very robust way. Additionally, COFDM allows for forward error correction, embedded in the compression algorithm, whereas other modulation schemes, such as FM, do not.

A COFDM scheme makes use of multiple discrete RF carriers within a particular RF channel. The number of carriers for a given COFDM RF channel is a function of total baseband data throughput, i.e., a higher volume of data requires more discrete carriers and therefore a larger overall RF channel. Parsing segments of the multiplexed baseband data, which may include composite video data, audio data, and control data, over several discrete carriers allows for parallel data distribution at a relatively low data payload bitrate per carrier. This relatively lower discrete carrier data payload bitrate allows for longer symbol duration in time, mitigating inter-symbol corruption due to multipath fading and distortion, thereby increasing receiver sensitivity by lowering bit error rates in harsh conditions.

Exemplary embodiments of the invention comprise a teleoperated unmanned ground mobile robotic platform that uses a single simplex 2.5 MHz channel bandwidth COFDM microwave RF link to transport low-latency video, audio, and sensor/status feedback serial data base band signals from the UGV to the OCU with 400 discrete carriers, one simplex 25 kHz channel bandwidth FM VHF/UHF RF link to transport low-latency command and control serial data from the OCU to the UGV, and one simplex 12.5 kHz channel bandwidth FM VHF/UHF RF link to transport public address audio from the OCU to the UGV.

In alternative embodiments, when environmental or system requirements prohibit the use of VHF/UHF frequencies, a single simplex 50 kHz channel bandwidth COFDM microwave RF link with substantially less than 400 discrete carriers may be substituted in place of the FM channels for command and control and public address audio. While specific bandwidths are provided in accordance with the foregoing embodiments and the subsequent discussion, such bandwidths are provided by way of example and not of limitation. It is noted, however, that the relative size relationships of the bandwidths for the different links may be advantageous for some embodiments, with the bandwidth for the link transporting video, audio, and sensor/status feedback being larger (generally by an order of magnitude) than the bandwidth for the link for the command and control data, which, in turn, is larger than the bandwidth for the link for public address audio.

The communications architecture of embodiments of the invention provides for high levels of RF performance (LOS and NLOS), several times that of equivalent all-FM systems (approximately seven-to-one range improvement over the same channel power levels), improved RF spectrum efficiency, and a high degree of cost to performance efficiency (especially with the hybrid, i.e., COFDM and FM, version). The system is thus enhanced for this application to pass the necessary video, data, and audio base band signals at near real-time under the harshest of practical mobility conditions.

Embodiments of the invention use a blend of narrow RF channel bandwidth FM hardware and wider RF channel bandwidth COFDM hardware (this may be termed a hybrid implementation), or narrow RF channel bandwidth COFDM hardware and wider RF channel bandwidth COFDM hardware (this may be termed a full-COFDM implementation). Embodiments of the invention are compliant with radiated RF power and channel bandwidth limits for ground-based tele-operated robotics application under FCC and National Telecommunications & Information Administration (NTIA) rules. Further, embodiments of the invention are fully compliant with the Joint Architecture for Unmanned Systems (JAUS) standard for the low speed serial (LSS) mode of operation by providing a return data channel from the UGV to the OCU, thus providing closed-loop control. JAUS is a common language enabling internal and external communication between unmanned systems. JAUS incorporates a component-based, message-passing architecture specifying data formats that promotes the stability of capabilities by projecting anticipated requirements as well as those currently needed. Furthermore, JAUS is open, scalable, and responsive to the unmanned systems communities' needs.

Narrow-band, or narrow bandwidth, refers to a signal which occupies only a small amount of space in the radio spectrum, relative to another signal. As used herein, the terms narrow-band and narrow bandwidth are described relative to a typical communication link between an OCU and a UGV in a ground-mobile robotic vehicle system, which is typically approximately 17.5 MHz for a simplex FM link and 22 MHz for a duplex spread spectrum link. Thus, the terms narrow-band and narrow bandwidth as used herein with regards to carrier signals which include video data generally refer to carrier signals which occupy less than 15% of the radio spectrum occupied by carrier signals which include video data transmitted via a typical simplex communication link and less than 12% of the radio spectrum occupied by carrier signals which include video data transmitted via a typical duplex communications link. The terms narrow-band and narrow bandwidth as used herein with regards to signals which do not include video data generally refer to signals which occupy less than 0.5% of the radio spectrum used for signals which do not include video data transmitted via a typical simplex or duplex communication link.

In embodiments of the hybrid implementation, a COFDM microwave RF video link may be used to transmit video, serial feedback data, and audio signals from the UGV to the OCU. The COFDM transmitter and receiver modules typically have separate video, serial data, and audio inputs and outputs, respectively, and the modules multiplex/de-multiplex the signals at each end. Transmitting the multiplexed video, audio, and feedback data requires the base band signal structure, derived from the overall ground mobile robotic system architecture, to have been chosen such that the video, audio, and data signals are separated and in a suitable format to send over the COFDM and narrow band FM RF links. The COFDM modules used for one embodiment of this link have a 2.5 MHz RF channel bandwidth. A narrow RF channel bandwidth FM VHF/UHF data link may be used to provide the data signal from the OCU to the UGV. In certain embodiments, a choice may be made between a RF channel bandwidth of 12.5 kHz for 9600 bits per second data throughput (non-JAUS compliant) and a RF channel bandwidth of 25 kHz for 19200 bits per second data throughput (JAUS compliant). A narrow RF channel bandwidth FM VHF/UHF audio link may be used to provide public address audio from the OCU to the UGV. Audio RF channel bandwidth may be 12.5 kHz.

In embodiments of the all-COFDM version, a COFDM microwave RF video link may be used to send video, serial data, and audio signals from the UGV to the OCU, as in the hybrid implementation. The COFDM transmitter and receiver modules typically have separate video, serial data, and audio inputs and outputs, respectively, and the modules multiplex/de-multiplex the signals at each end. The COFDM modules used for this link may have a 2.5 MHz RF channel bandwidth. Unlike the hybrid implementation, however, a narrow RF channel bandwidth COFDM microwave data/audio link may be used to provide the command and control serial data signal and the public address audio signal from the OCU to the UGV. The COFDM module used for this link may have a 50 kHz RF channel bandwidth.

COFDM RF links with RF channels and bit rates suitable to transport near real-time video signals occupy (consume) much more spectrum than RF channels required to transport discrete low bandwidth command and control data or audio signals. This is the reason federal regulations require wide band RF channels, such as those required to transport real-time video, to operate in specific regions of the RF spectrum (900 MHz, 2.4 GHz, and 5.0 GHz for non-licensed/low power systems and 2.4 GHz or 4.9 GHz for licensed/high power systems), so as to avoid creating interference problems with the vast number of narrow channel systems operating in the lower regions of the RF spectrum. Narrow band FM RF channels operate sufficiently well to transport Command and Control data and audio in the ground mobile robotics operating environment and provide robust performance. Unlike wide-band rules which restrict FM video channel performance by placing relatively low power output caps on transmissions and force carrier frequencies into either shared bands saturated with unregulated RF traffic or microwave segments of the RF spectrum which are regulated but produce poor RF propagation characteristics, federal regulations for narrow band FM allow for channel power levels (+47 dBm or more) which, when coupled with the typically outstanding receiver sensitivity levels for 12.5 or 25 kHz channels (−116 dBm or −113 dBm, respectively), result in an acceptable RF dynamic range under harsh fading conditions. This superior narrow band channel performance is further enhanced by federal regulations allowing the use of highly regulated VHF/UHF carrier channel frequencies, which propagate much more efficiently under NLOS ground mobility conditions than microwave carriers, as narrower channels and longer carrier wavelengths improve the critical factors in Rayleigh and Ricean fading distribution. Additionally, long wavelength carriers do not suffer from the dramatic loss factors (absorption/scatter) associated with penetrating solid objects as microwave carriers do and therefore provide inherently superior propagation performance in non line of sight conditions.

The narrow band FM RF links work very well in the ground-mobile robotic vehicle application. The narrow band FM RF links are time efficient, offering an even lower signal latency penalty than a processor-driven COFDM link, more power efficient, requiring less active processing, and more cost-efficient. A significant benefit in utilizing the COFDM/FM hybrid system implementation to provide bi-directional communications for an unmanned ground mobile robot is spectral efficiency. This approach occupies less RF spectrum, thereby limiting interference/fading issues and allowing more systems to be operated simultaneously in the same environment, in addition to offering excellent system latency response and cost to performance ratio.

One key to improving RF performance under mobility conditions is to optimize the base band signal bandwidth, such that the information payload (throughput/bandwidth) actually shipped from one point over the air to another point is minimized, following Shannon's Law. Channel step-sizes of 12.5 kHz and 25 kHz are mandated by federal law, rather than arbitrarily selected, for narrow band VHF/UHF channels in mobility applications. As there are practical limits on how much data throughput can be achieved over a 12.5 or 25 kHz FM channel bandwidth serial modem RF link (9600 BAUD or 19.2 kbps, respectively), system communications architecture at the transport layer, i.e., below RF (the physical layer), plays a role in keeping overall data payload volumes low at the RF layer. Maximizing the information contained within the given data payload allows for the use of extremely bandwidth-efficient serial communications, compared to transport media such as TCP/IP (Ethernet). Ethernet is designed for a higher volume of data transport, but also requires a much higher overhead bandwidth with respect to the physical layer. In other words, much more channel bandwidth is required to transport a given volume of payload data via Ethernet than is required to transport the same data serially (understanding that standard serial com port architecture has inherent throughput limits, while Ethernet throughput is theoretically only limited by available bandwidth). While this higher channel bandwidth requirement does not impose a significant penalty when the physical layer is wire (CAT-5 cable) or light (fiber-optics), this higher channel bandwidth requirement has a direct and negative impact on throughput performance when the physical layer is an RF link. The unnecessarily wide transport layer bandwidth of Ethernet cascades into a wider RF channel bandwidth, degrading receiver sensitivity and system RF dynamic power range. A 19.2 kbps serial throughput allows for JAUS-compliant communications and allows for the use of 25 kHz FM channels, with improved receiver sensitivity, in the VHF/UHF spectrum at high power levels, while maintaining full compliance with federal communications law.

Some special application requirements prohibit or otherwise restrict the use of the more desirable segments of RF spectrum (VHF/UHF). Systems operating in locations where there is no regulated VHF/UHF spectrum available (e.g., theater-wide combat area or third world country with ineffective or non-existent spectrum controlling regulatory bodies) or systems employing RF counter-measures (e.g., active radio jammers) designed to saturate broad segments of spectrum with man-made RF noise, typically require all radio control system channels to operate exclusively in the quieter microwave region, away from the VHF/UHF area. Once all system RF carriers are placed in the microwave region of spectrum, the regulatory and physical advantages of long wavelength carrier propagation are lost and must be recovered by other means to maintain mobility performance. Under these or other circumstances, a narrow band (50 kHz) COFDM link may be substituted for the FM command and control data (at 19.2 kbps) and public address audio links.

The maintenance of a low bandwidth command and control channel is instrumental in the case of using a microwave carrier to transport this information to a ground mobility platform. A tactical unmanned ground vehicle, by its inherent nature, must utilize omni-directional antennas as the operator cannot predict from what angle the incident RF signal generated at the OCU will arrive at the vehicle. Omni-directional antennas provide very little RF power gain, as opposed to a directional antenna that makes use of a focused beam. Antenna gain figures directly impact RF dynamic power range and the advantage of using directional antennas on the OCU side of the video link, where the video receiver is located, is lost in the opposite direction, when the receiver (in this case, receiving command and control data rather than video) is located on the UGV side. Both the disadvantage of wavelength size (propagation) and the disadvantage of omni-directional antennas instead of directional antennas (gain/noise filtering) at the receiver are greatly mitigated with the use of a narrow-band COFDM command and control/PA audio link. The narrow channel COFDM receiver sensitivity (−110 dBm) and error correction components allow for similar performance in microwave frequencies that were obtained with FM links in VHF/UHF. The penalties associated with bi-directional COFDM (i.e., the full-COFDM implementation), as opposed to the hybrid COFDM/FM architecture, are increased, but acceptable. The penalties typically include increased round-trip signal latency (160 ms as opposed to 80 ms), decreased spectral efficiency (50 kHz as opposed to 37.5 kHz for command and control & P/A audio), and increased system cost.

Figure 1:
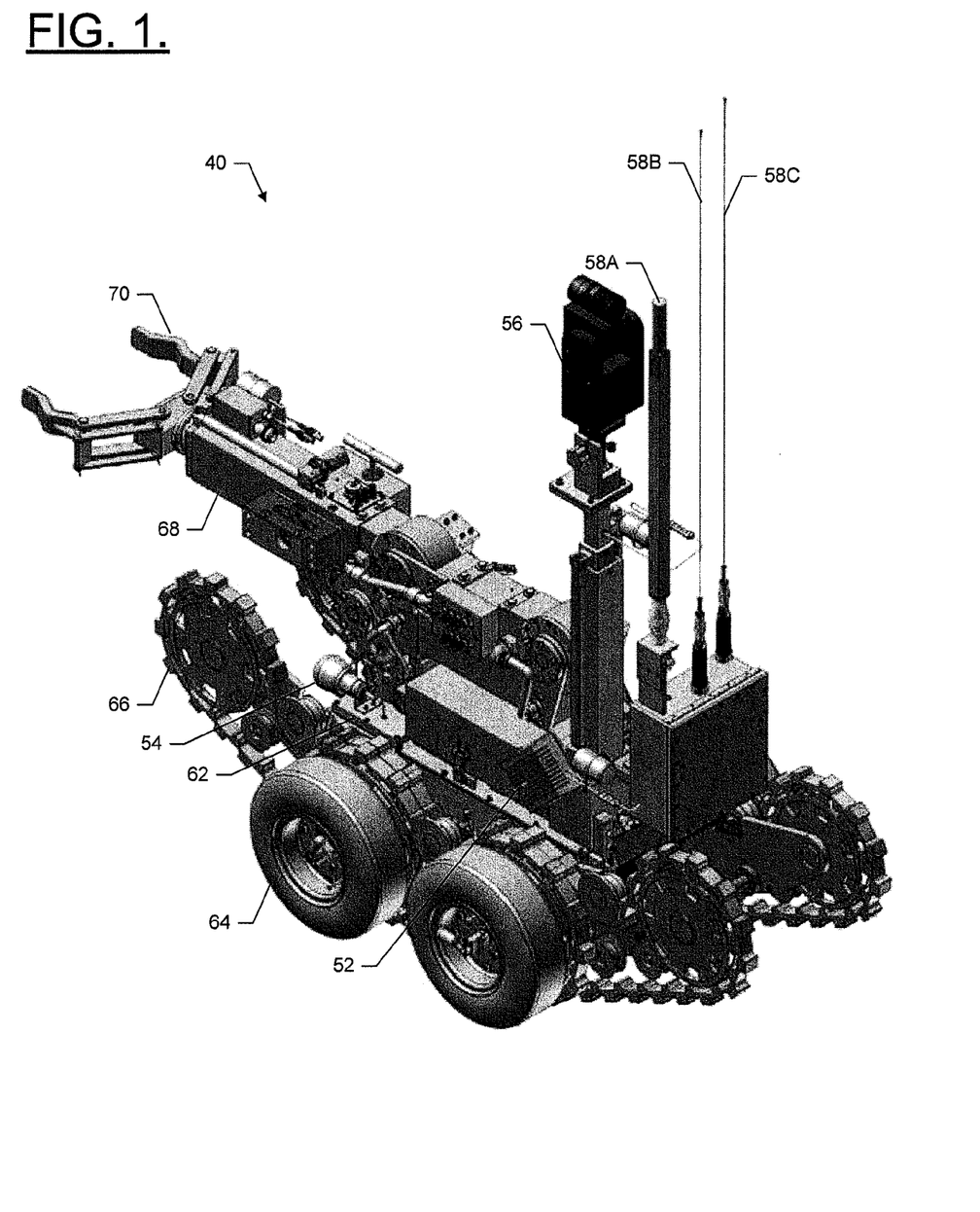
FIG. 1 is a left perspective view of a ground-mobile robotic vehicle, in accordance with an exemplary embodiment of the invention.

Referring now to FIG. 1, a left perspective view of a ground-mobile robotic vehicle is illustrated, in accordance with an exemplary embodiment of the invention. The UGV 40 of FIG. 1 comprises a chassis 62 with a drive system including motor-driven wheels 64 and/or an articulating track 66, a manipulator arm 68 with gripper 70, surveillance camera 56 and microphone 54 for capturing video and audio for transmission to the OCU, a loudspeaker 52 for broadcast of sound transmitted from the OCU, and three antennas 58A, 58B, 58C for transmitting signals to and receiving signals from the OCU.

Figure 2:
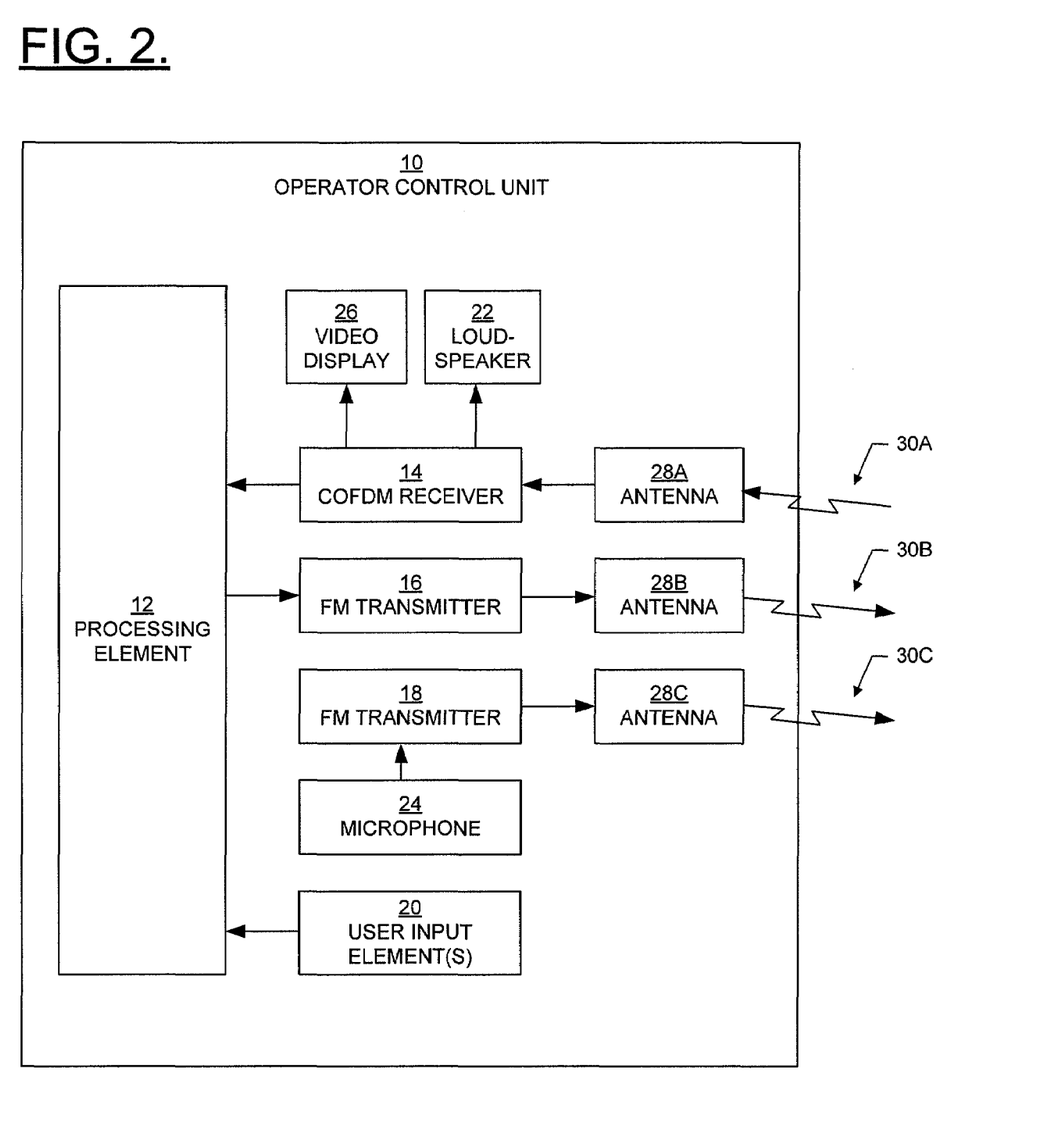
FIG. 2 is a schematic block diagram of an operator control unit of a ground-mobile robotic system, in accordance with an exemplary embodiment of the invention.

Referring now to FIG. 2, a schematic block diagram of an OCU of a ground-mobile robotic system is illustrated, in accordance with an exemplary embodiment of the invention. FIG. 2 illustrates an OCU utilizing a hybrid implementation. OCU 10 comprises a processing element 12, a COFDM receiver 14, two FM transmitters 16, 18, one or more user input elements (e.g., joystick and/or keyboard), a loudspeaker 22, a microphone 24, a video display 26, and three antennas 28A, 28B, 28C.

While the processing element 12 can be configured in various manners, the processing element may be comprised of a microprocessor, controller, dedicated or general purpose electronic circuitry, a suitably programmed computing device, or other means for controlling the operation of an OCU.

The processing element 12 may be configured to receive user (i.e., operator) inputs via the user input element 20. Such user inputs typically comprise commands to direct the movement and actions of the UGV. The user inputs are converted by the processing element 12, typically into JAUS-compliant command and control data. The processing element 12 sends the command and control data via a low speed serial (LSS) data stream (generally either 9600 bits per second or 19.2 kilobits per second) over an RS-232 connection to the FM transmitter 16. The FM transmitter 16 modulates the command and control data RF carrier and the modulated data RF carrier is transmitted to the UGV via antenna 28B at a frequency in either the ultra-high frequency (UHF) or the very-high frequency (VHF) range. The transmitted data 30B of one embodiment is transmitted over an RF channel having a narrow bandwidth of either 12.5 kHz for 9600 bits per second data throughput (non-JAUS compliant) or 25 kHz for 19.2 kilobits per second data throughput (JAUS compliant).

The operator may also desire to broadcast speech (e.g., warnings or negotiations) or other PA audio at the UGV. The operator would speak into the microphone 24, and the resulting analog audio signal would be sent to the FM transmitter 18. The FM transmitter 18 modulates the audio signal RF carrier and the modulated RF carrier signal is transmitted to the UGV via antenna 28C at a frequency in either the ultra-high frequency (UHF) or the very-high frequency (VHF) range. The transmitted data 30C of one embodiment is transmitted over an RF channel having a narrow bandwidth of 12.5 kHz.

The operation of receiving video, audio, and sensor data 30A via antenna 28A and COFDM receiver 14 will be discussed below.

Figure 3:
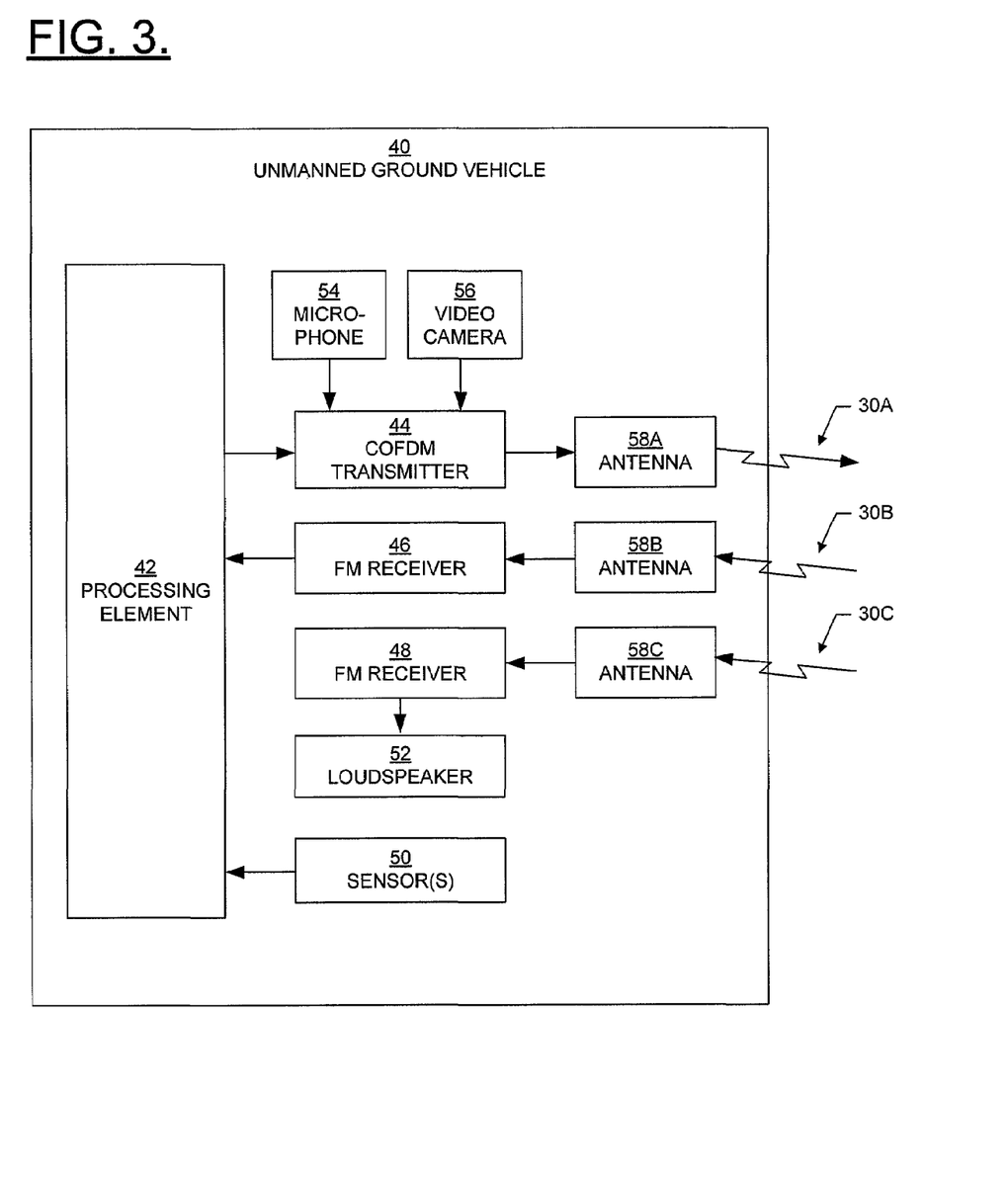
FIG. 3 is a schematic block diagram of an unmanned ground vehicle of a ground-mobile robotic system, in accordance with an exemplary embodiment of the invention.

Referring now to FIG. 3, a schematic block diagram of an unmanned ground vehicle of a ground-mobile robotic system is illustrated, in accordance with an exemplary embodiment of the invention. FIG. 3 illustrates a UGV utilizing a hybrid implementation. UGV 40 comprises a processing element 42, a COFDM transmitter 44, two FM receivers 46, 48, a plurality of sensors 50, a loudspeaker 52, a surveillance microphone 54, a video camera 56, and three antennas 58A, 58B, 58C.

While the processing element 42 can be configured in various manners, the processing element may be comprised of a microprocessor, controller, dedicated or general purpose electronic circuitry, a suitably programmed computing device, or other means for controlling the operation of a UGV.

The antenna 58B receives the JAUS-compliant command and control data 30B transmitted from the OCU. The received data RF carrier is demodulated by the FM receiver 46 and the extracted data is provided to the processing element 42. The processing element 42 may be configured to receive the command and control data and to control the operation of the UGV according to the received commands. For example, the command and control data may direct the UGV to travel in a particular direction and/or to perform a particular task with the manipulator arm (not illustrated). In response to the received command and control data, the processing element 42 will activate motors and actuators (not illustrated) in predefined sequences to cause the desired movement and/or actions. As the processing element 42 activates the motors and actuators to cause the desired movement and/or action, the sensors 50 on the UGV provide feedback to the processing element 42 to confirm that the commanded activations, movements, and/or actions are occurring. As will be discussed further below, the sensor feedback data is also transmitted to the OCU.

The antenna 58C receives the PA audio data 30C transmitted from the OCU. The received data RF carrier is demodulated by the FM receiver 48 and the extracted data is provided to the loudspeaker 52 from which the audio is broadcast.

The surveillance microphone captures audio and provides analog audio data to the COFDM transmitter 44. The video camera captures video and provides analog video data to the COFDM transmitter 44. The processing element 42 sends the sensor feedback data via a low speed serial (LSS) data stream (generally 9600 bits per second or 19.2 kilobits per second) over an RS-232 connection to the COFDM transmitter 44. Having this sensor data fed back allows for closed loop control of the UGV over-the-air without adding an additional RF link, thereby allowing for JAUS compliance utilizing the JAUS LSS mode implementation. The COFDM transmitter 44 compresses and multiplexes the video data, the audio data, and the sensor feedback data, and then modulates the multiplexed data RF carrier using a COFDM scheme. The modulated multiplexed video/audio/sensor data RF carrier 30A of one embodiment is transmitted to the OCU via antenna 58A at a frequency in the microwave range, over an RF channel having a bandwidth of 2.5 MHz.

Referring again to FIG. 2, the multiplexed video/audio/sensor data RF carrier 30A transmitted by the UGV 40 is received by antenna 28A of the OCU 10, and then demodulated, de-multiplexed and uncompressed by COFDM receiver 14. The video data may then be displayed on the video display 26. The surveillance audio data may be broadcast on the loudspeaker 22. The sensor feedback data may be provided to processing element 12 to provide closed-loop control. The video/audio/sensor data may also be stored for future analysis, if desired, in a storage element (not illustrated).

Figure 4:
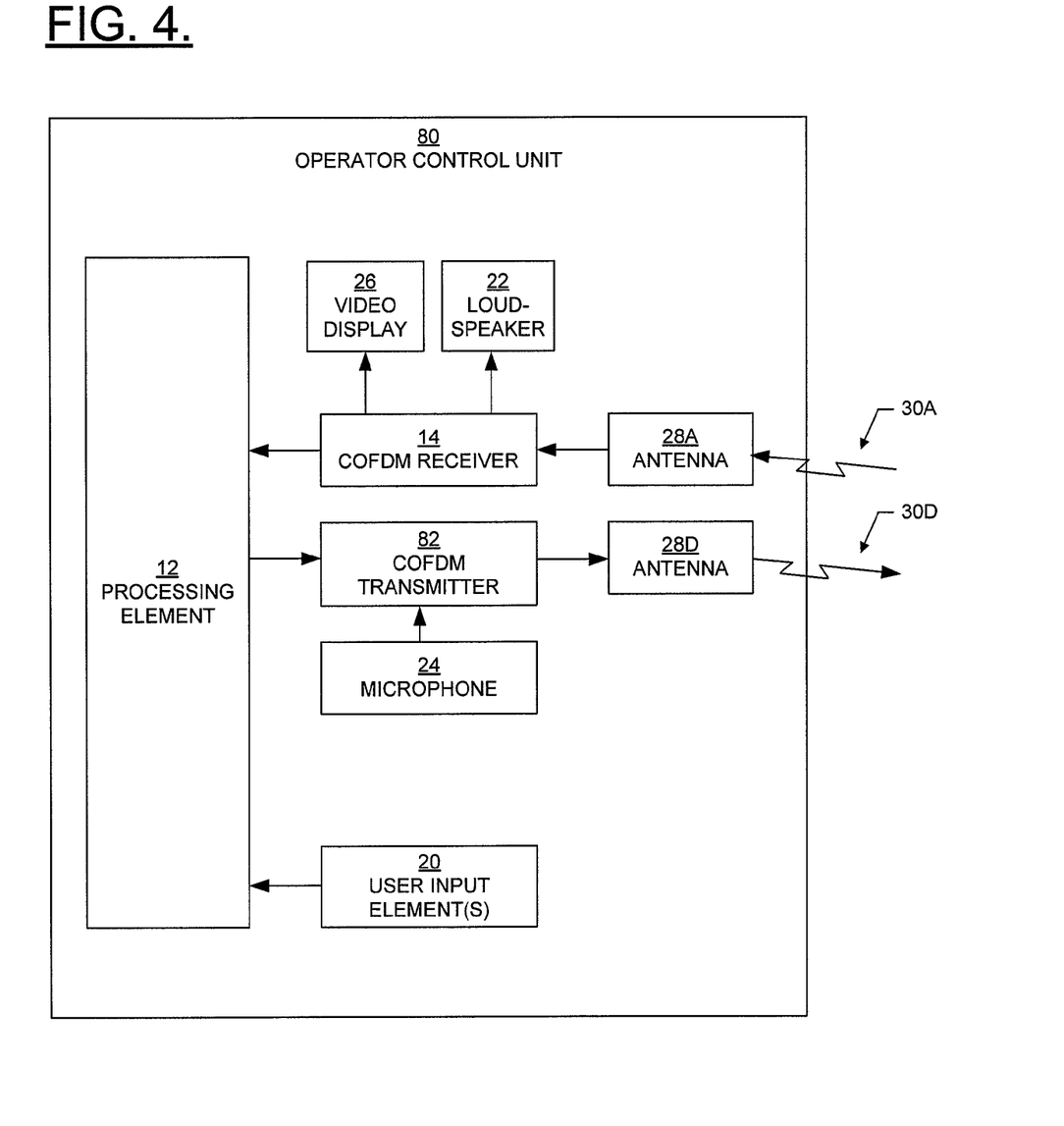
FIG. 4 is a schematic block diagram of an operator control unit of a ground-mobile robotic system, in accordance with an alternative exemplary embodiment of the invention.
Figure 5:
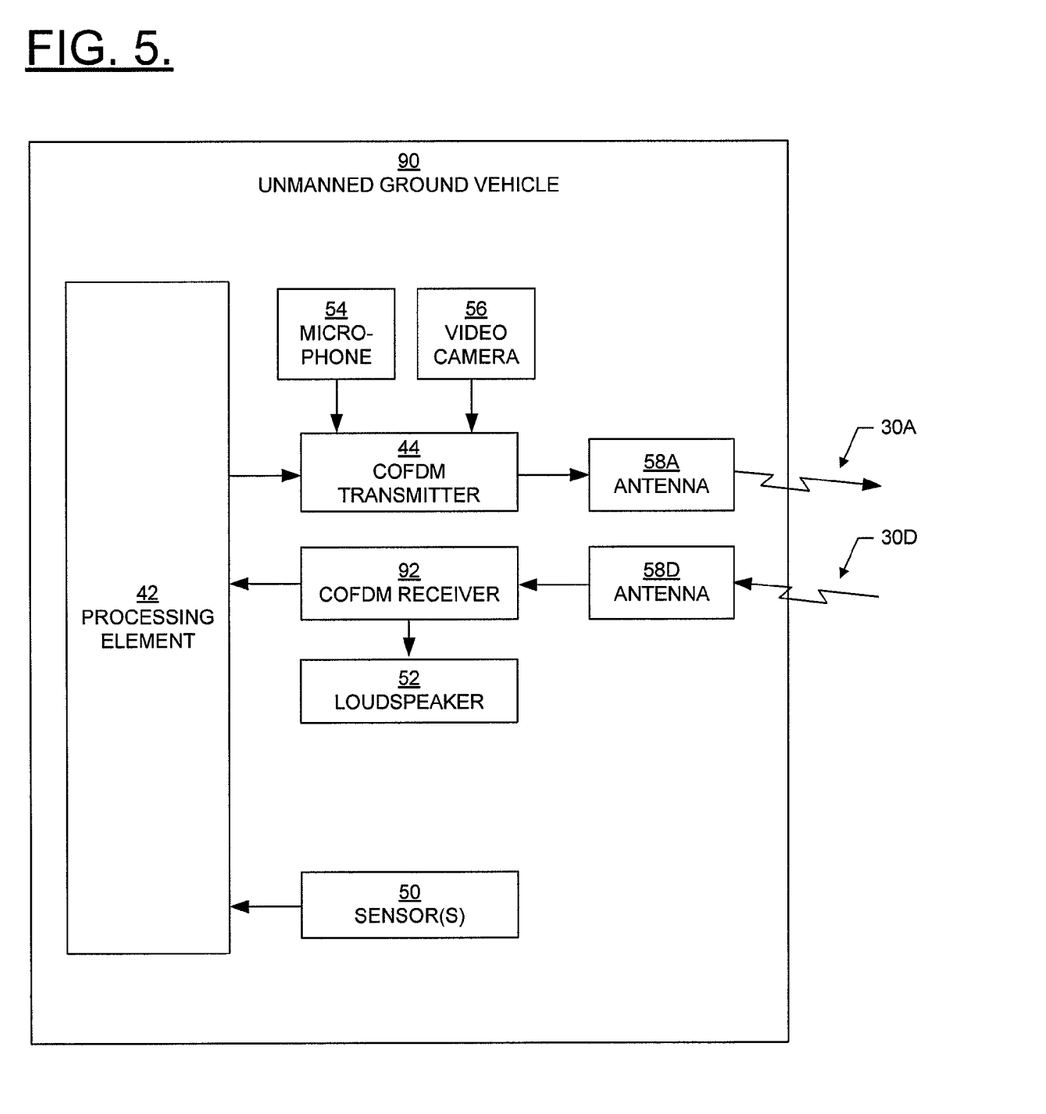
FIG. 5 is a schematic block diagram of an unmanned ground vehicle of a ground-mobile robotic system, in accordance with an alternative exemplary embodiment of the invention.

As discussed above, FIGS. 2 and 3 illustrate an OCU and UGV utilizing a hybrid implementation. When environmental or system requirements prohibit the use of VHF/UHF frequencies, a single simplex 50 kHz channel bandwidth COFDM microwave RF link may be substituted in place of the FM channels for command and control and PA audio. Referring now to FIGS. 4 and 5, schematic block diagrams of an OCU and a UGV, respectively, of a ground-mobile robotic system are illustrated, in accordance with an alternative exemplary embodiment of the invention. FIGS. 4 and 5 illustrate an OCU and UGV utilizing an all-COFDM implementation. As illustrated in FIG. 4, the two FM transmitters of the OCU 80 have been replaced with a single COFDM transmitter 82. The COFDM transmitter 82 receives command and control data from the processing element 12 and audio data from the microphone 24. The COFDM transmitter 82 compresses and multiplexes the command and control data and audio data, and then modulates the multiplexed data RF carrier using a COFDM scheme and transmits the modulated data RF carrier via the antenna 28D. The resulting multiplexed signal 30D is transmitted to the OCU via antenna 28D at a frequency in the microwave range, over an RF channel having a narrow bandwidth of 50 kHz.

As illustrated in FIG. 5, the two FM receivers of the UGV 90 have been replaced with a single COFDM receiver 92. The multiplexed command and control data and audio data RF carrier is received via antenna 58D, and then demodulated, de-multiplexed and uncompressed by COFDM receiver 92. The command and control data is processed by the processing element 42, and the audio data is broadcast by the loudspeaker 52.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A ground-mobile robotic system comprising:
    an operator control unit (OCU) comprising:
        a first coded orthogonal frequency division multiplexing (COFDM) receiver,
        a first OCU transmitter,
        a second OCU transmitter configured to receive analog audio data from an OCU audio source, modulate an audio data radio frequency (RF) carrier, and transmit the modulated audio data RF carrier via a first simplex RF channel, and
        an OCU processing element configured to provide control data to the first OCU transmitter via a first serial communication link; and
    an unmanned ground vehicle (UGV) comprising:
        a first COFDM transmitter configured to receive analog video data from a video source and to receive analog audio data from a UGV audio source,
        a first UGV receiver,
        a second UGV receiver, and
        a UGV processing element configured to provide feedback data to the first COFDM transmitter via a second serial communication link;
    wherein the first OCU transmitter is configured to modulate a control data RF carrier and transmit the modulated control data RF carrier to the UGV via a second simplex RF channel such that the transmitted control data RF carrier is received by the first UGV receiver,
    wherein the first COFDM transmitter of the UGV is configured to multiplex the feedback data, the video data and the audio data, modulate multiplexed data RF carriers using a COFDM scheme and transmit the modulated multiplexed data RF carriers to the OCU via a third simplex RF channel, wherein the first COFDM receiver of the OCU is configured to receive the modulated multiplexed data RF carrier from the UGV, demodulate the received data RF carrier to extract the multiplexed data, and de-multiplex the extracted data into separate video data, audio data, and feedback data, and wherein the first COFDM receiver is further configured to provide the video data to a video display element, provide the audio data to an OCU loudspeaker, and provide the feedback data to the OCU processing element.

2. The system of claim 1, wherein the OCU processing element is configured to provide control data to the first OCU transmitter via the first serial communication link at a data speed less than 21 kilobits per second.

3. The system of claim 1, wherein the UGV processing element is configured to provide feedback data to the first COFDM transmitter via the second serial communication link at a data speed less than 21 kilobits per second.

4. The system of claim 1, wherein the first COFDM transmitter is further configured to transmit the modulated multiplexed data RF carrier to the OCU via the third simplex RF channel having a channel bandwidth less than 2.75 megahertz.

5. The system of claim 1, wherein the first and second OCU transmitters each comprise a frequency modulation (FM) transmitter and the first and second UGV receivers each comprise a FM receiver, wherein the first OCU transmitter is configured to modulate the control data RF carrier using an FM scheme and transmit the FM control data RF carrier to the UGV via the second simplex RF channel, wherein the second OCU transmitter is configured to modulate the audio data RF carrier using the FM scheme and transmit the FM audio data RF carrier to the UGV via the first simplex RF channel, wherein the first UGV receiver is configured to receive the modulated control data RF carrier, demodulate the received control data RF carrier to extract the control data, and provide the extracted control data to the UGV processing element, and wherein the second UGV receiver is configured to receive the modulated audio data RF carrier, demodulate the received audio data RF carrier to extract the audio data, and provide the extracted audio data to a UGV loudspeaker.

6. The system of claim 5 wherein the first OCU transmitter is configured to transmit the FM control data RF carrier to the UGV via the second simplex RF channel having a channel bandwidth less than 27.5 kilohertz, and wherein the second OCU transmitter is configured to transmit the FM audio data RF carrier to the UGV via the first simplex RF channel having a channel bandwidth less than 14 kilohertz.

7. The system of claim 1, wherein the first and second OCU transmitters comprise a second COFDM transmitter configured to multiplex the control data and audio data, modulate the multiplexed data RF carriers using the COFDM scheme, and transmit the COFDM multiplexed data RF carriers to the UGV via fourth simplex RF channel, and wherein the first and second UGV receivers comprise a second COFDM receiver configured to receive the modulated multiplexed data RF carriers, demodulate the received data RF carriers to extract the multiplexed data, de-multiplex the extracted data into control data and audio data, provide the control data to the UGV processing element, and provide the audio data to a UGV loudspeaker.

8. The system of claim 7, wherein the second COFDM transmitter is configured to transmit the COFDM multiplexed data RF carriers to the UGV via the fourth simplex RF channel having a channel bandwidth less than 55 kilohertz.

9. A ground-mobile robotic system comprising:

an operator control unit (OCU) comprising a first coded orthogonal frequency division multiplexing (COFDM) receiver, a first OCU transmitter, and an OCU processing element configured to provide control data to the first OCU transmitter via a first serial communication link; and an unmanned ground vehicle (UGV) comprising at COFDM transmitter configured to receive analog video data from a video source, a first UGV receiver, and a UGV processing element configured to provide feedback data to the first COFDM transmitter via a second serial communication link;

wherein the first OCU transmitter is configured to modulate a control data radio frequency (RF) carrier and transmit the modulated control data RF carrier to the UGV via a first simplex RF channel such that the transmitted control data RF carrier is received by the first UGV receiver, wherein the first COFDM transmitter of the UGV is configured to multiplex the feedback data and the video data, modulate multiplexed data RF carriers using a COFDM scheme and transmit the modulated multiplexed data RF carriers to the OCU via a second simplex RF channel, wherein the first COFDM receiver of the OCU is configured to receive the modulated multiplexed data RF carriers from the UGV, demodulate the received data RF carriers to extract the multiplexed data, and de-multiplex the extracted data into separate video data and feedback data, and wherein the first COFDM receiver is further configured to provide the video data to a video display element and provide the feedback data to the OCU processing element.

10. The system of claim 9, wherein the OCU processing element is configured to provide control data to the first OCU transmitter via the first serial communication link at a data speed less than 21 kilobits per second.

11. The system of claim 9, wherein the UGV processing element is configured to provide feedback data to the COFDM transmitter via the second serial communication link at a data speed less than 21 kilobits per second.

12. The system of claim 9, wherein the COFDM transmitter is further configured to transmit the modulated multiplexed data RF carriers to the OCU via the second simplex RF channel having a channel bandwidth less than 2.75 megahertz.

13. The system of claim 9, wherein the COFDM transmitter is configured to receive analog audio data from a UGV audio source and to multiplex the audio data with the feedback data and the video data, and wherein the COFDM receiver is configured to de-multiplex the demodulated data RF carriers into separate video data, audio data, and feedback data and provide the audio data to an OCU loudspeaker.

14. The system of claim 9, wherein the OCU further comprises a second OCU transmitter configured to receive analog audio data from an OCU audio source, modulate the audio data RF carrier, and transmit the modulated audio data RF carrier via a simplex RF channel, and wherein the UGV further comprises a second UGV receiver configured to receive the modulated audio data RF carrier, demodulate the received audio data RF carrier to extract the audio data, and provide the extracted audio data to a UGV loudspeaker.

15. The system of claim 14, wherein the first and second OCU transmitters each comprise a frequency modulation (FM) transmitter and the first and second UGV receivers each comprise a FM receiver, wherein the first OCU transmitter is configured to modulate the control data RF carrier using an FM scheme and transmit the FM control data RF carrier to the UGV via the first simplex RF channel, wherein the second OCU transmitter is configured to modulate the audio data RF carrier using the FM scheme and transmit the FM audio data RF carrier to the UGV via a third simplex RF channel, wherein the first UGV receiver is configured to receive the modulated control data RF carrier, demodulate the received control data RF carrier to extract the control data, and provide the extracted control data to the UGV processing element, and wherein the second UGV receiver is configured to receive the modulated audio data RF carrier, demodulate the received audio data RF carrier to extract the audio data, and provide the extracted audio data to the UGV loudspeaker.

16. The system of claim 15, wherein the first OCU transmitter is configured to transmit the FM control data RF carrier to the UGV via the first simplex RF channel having a channel bandwidth less than 27.5 kilohertz, and wherein the second OCU transmitter is configured to transmit the FM audio data RF carrier to the UGV via the third simplex RF channel having a channel bandwidth less than 14 kilohertz.

17. The system of claim 14, wherein the first and second OCU transmitters comprise a second COFDM transmitter configured to multiplex the control data and audio data, modulate the multiplexed data RF carriers using the COFDM scheme, and transmit the COFDM multiplexed data RF carriers to the UGV via a fourth simplex RF channel, and wherein the first and second UGV receivers comprise a second COFDM receiver configured to receive the modulated multiplexed data RF carriers, demodulate the received data RF carriers to extract the multiplexed data, de-multiplex the extracted data into control data and audio data, provide the control data to the UGV processing element, and provide the audio data to the UGV loudspeaker.

18. The system of claim 17, wherein the second COFDM transmitter is configured to transmit the COFDM multiplexed data RF carriers to the UGV via the fourth simplex RF channel having a channel bandwidth less than 55 kilohertz.

19. An unmanned ground vehicle (UGV) of a ground-mobile robotic system comprising:

a coded orthogonal frequency division multiplexing (COFDM) transmitter configured to receive analog video data from a video source and to receive analog audio data from an audio source;

a first UGV receiver configured to receive a modulated control data radio frequency (RF) carrier transmitted from an operator control unit (OCU) via a first simplex RF channel;

a second UGV receiver configured to receive a modulated audio data RF carrier transmitted from the OCU via a second simplex RF channel; and a UGV processing element configured to provide feedback data to the COFDM transmitter via a serial communication link, wherein the COFDM transmitter is configured to multiplex the feedback data, the video data and the audio data, modulate multiplexed data RF carriers using a COFDM scheme and transmit the modulated multiplexed data RF carriers to a COFDM receiver of the OCU via a third simplex RF channel, wherein the COFDM receiver is configured to de-multiplex the extracted data into separate video data, audio data and feedback data and provide the video data to a video display element, provide the audio data to an OCU loudspeaker and provide the feedback data to an OCU processing element.

20. The unmanned ground vehicle of claim 19, wherein the first and second UGV receivers each comprise a frequency modulation (FM) receiver, wherein the first UGV receiver is configured to receive the modulated control data RF carrier from the OCU via the first simplex RF channel, demodulate the received control data RF carrier to extract the control data, and provide the extracted control data to the UGV processing element, and wherein the second UGV receiver is configured to receive the modulated audio data RF carrier from the OCU via the second simplex RF channel, demodulate the received audio data RF carrier to extract the audio data, and provide the extracted audio data to a UGV loudspeaker.

21. The unmanned ground vehicle of claim 19, wherein the first and second UGV receivers comprise a COFDM receiver configured to receive the modulated multiplexed data RF carriers from the OCU via a fourth simplex RF channel, demodulate the received data RF carriers to extract the multiplexed data, de-multiplex the extracted data into control data and audio data, provide the control data to the UGV processing element, and provide the audio data to a UGV loudspeaker.

22. An operator control unit (OCU) of a ground-mobile robotic system comprising:

a coded orthogonal frequency division multiplexing (COFDM) receiver, a first OCU transmitter, a second OCU transmitter configured to receive analog audio data from an OCU audio source, modulate an audio data radio frequency (RF) carrier, and transmit the modulated audio data RF carrier to an unmanned ground vehicle (UGV) via a first simplex RF channel, and an OCU processing element configured to provide control data to the first OCU transmitter via a serial communication link; and wherein the first OCU transmitter is configured to modulate a control data RF carrier and transmit the modulated control data RF carrier to the UGV via a second simplex RF channel, wherein the COFDM receiver is configured to receive multiplexed feedback data, video data and audio data RF carriers which have been modulated using a COFDM scheme and transmitted from the UGV via a third simplex RF channel, wherein the COFDM receiver is further configured to demodulate the received data RF carriers to extract the multiplexed data, and de-multiplex the extracted data into separate video data, audio data, and feedback data, and wherein the COFDM receiver is further configured to provide the video data to a video display element, provide the audio data to an OCU loudspeaker, and provide the feedback data to the OCU processing element.

23. The operator control unit of claim 22, wherein the first and second OCU transmitters each comprise a frequency modulation (FM) transmitter, wherein the first OCU transmitter is configured to modulate the control data RF carrier using an FM scheme and transmit the FM control data RF carrier to the UGV via the second simplex RF channel, and wherein the second OCU transmitter is configured to modulate the audio data RF carrier using an FM scheme and transmit the FM audio data RF carrier to the UGV via the first simplex RF channel.

24. The operator control unit of claim 22, wherein the first and second OCU transmitters comprise a COFDM transmitter configured to multiplex the control data and audio data, modulate the multiplexed data RF carriers using the COFDM scheme, and transmit the COFDM multiplexed data RF carriers to the UGV via a fourth simplex RF channel.

25. A method of operating a ground-mobile robotic system comprising an operator control unit (OCU) and an unmanned ground vehicle (UGV), the method comprising:

receiving control data from an OCU processing element;

modulating a received control data radio frequency (RF) carrier;

transmitting the modulated control data RF carrier to the UGV via a first simplex RF channel;

receiving analog audio data from an OCU audio source;

modulating a received OCU audio data RF carrier;

transmitting the modulated audio data RF carrier to the UGV via a second simplex RF channel;

receiving analog video data from a UGV video source;

receiving analog audio data from a UGV audio source;

receiving feedback data from a UGV processing element;

multiplexing, via a coded orthogonal frequency division multiplexing (COFDM) transmitter, the received feedback data, video data and OCU audio data to generate multiplexed data RF carriers;

modulating the multiplexed data RF carriers using a COFDM modulation scheme;

transmitting the modulated multiplexed data RF carriers to a COFDM receiver of the OCU via a third simplex RF channel; and de-multiplexing, via the COFDM receiver, the multiplexed data into separate video data, audio data and feedback data and providing at least the feedback data to a processing element of the OCU.

26. The method of claim 25, wherein modulating the control data RF carrier comprises modulating the control data RF carrier using an FM scheme, and wherein modulating the OCU audio data RF carrier comprises modulating the audio data RF carrier using the FM scheme.

27. The method of claim 25, further comprising:

multiplexing the control data and the OCU audio data;

wherein modulating the control data and the OCU audio data RF carriers comprises modulating the multiplexed control data and OCU audio data RF carriers using the COFDM scheme.

* * * * *

UNITED STATES PATENT AND TRADEMARK OFFICE
CERTIFICATE OF CORRECTION

PATENT NO.      : 7,633,852 B2                                        Page 1 of 1
APPLICATION NO. : 11/425633
DATED           : December 15, 2009
INVENTOR(S)     : Brummette et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 781 days.

Signed and Sealed this

Ninth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,633,852 B2 | Page 1 of 1 |
| APPLICATION NO. | : 11/425633 | |
| DATED | : December 15, 2009 | |
| INVENTOR(S) | : Brummette et al. | |

It is certified that error appears in the above-identified patent and that said Letters Patent is hereby corrected as shown below:

<u>Title page,</u>

Item "(73) Assignee: Northrop Gruman Corporation, Los Angeles, CA (US)" should read --(73) Assignee: Northrop Grumman Corporation, Los Angeles, CA (US)--

Signed and Sealed this
Twelfth Day of February, 2013

Teresa Stanek Rea
*Acting Director of the United States Patent and Trademark Office*